United States Patent [19]

McGarvey et al.

[11] 3,965,919

[45] June 29, 1976

[54] HYDRAULIC SAFETY VALVE BASE

[76] Inventors: Robert E. McGarvey; Donald L. Gitthens, both of 5853 Owens, Arvada, Colo. 80002

[22] Filed: Sept. 26, 1974

[21] Appl. No.: 509,647

[52] U.S. Cl................................. 137/107; 91/442
[51] Int. Cl.².......................................... F16K 11/07
[58] Field of Search............... 137/102, 107; 91/442

[56] References Cited
UNITED STATES PATENTS

| | | | |
|---|---|---|---|
| 1,933,905 | 11/1933 | Hawks | 137/107 X |
| 3,074,384 | 1/1963 | Pilch | 137/102 X |
| 3,339,574 | 9/1967 | Erb et al. | 137/102 |
| 3,419,030 | 12/1968 | Gratzmuller | 137/102 |
| 3,606,905 | 9/1971 | Fehler | 137/107 |

FOREIGN PATENTS OR APPLICATIONS

| | | | |
|---|---|---|---|
| 923,745 | 4/1963 | United Kingdom | 137/107 |

Primary Examiner—Robert G. Nilson

[57] ABSTRACT

The present invention relates to a safety valve for use with a hydraulic system as is utilized in raising loads such as with a front-end loader, a fork truck, snorkel truck, and the like. The safety valve provides a spring actuated plunger which acts to trap hydraulic fluid within a hydraulic cylinder to retain a load in its raised position in the event a hydraulic feed line or the like should break.

7 Claims, 3 Drawing Figures

HYDRAULIC SAFETY VALVE BASE

BACKGROUND OF THE INVENTION

Hydraulic systems have enjoyed wide-spread use in a variety of fields, such as industry, construction, and the like, for such things as raising heavy loads, supporting loads, and raising and supporting work platforms. Hydraulic systems are used widely on such pieces of equipment as front-end loaders, fork trucks, snorkel trucks, tractors, and the like. To a large extent, the systems used are single action hydraulic systems. Single action hydraulic systems are those systems in which hydraulic fluid is introduced into a hydraulic cylinder on one side only of the piston member of that hydraulic cylinder. Introduction of the hydraulic fluid forces the piston in a first given direction and the weight of the load being raised by the piston causes the piston to move in the opposite direction when the fluid that has been introduced to the cylinders is allowed to escape. Although other more elaborate hydraulic systems are utilized in other areas and for other purposes, this basic single action hydraulic system is primarily the type used for lifting and supporting weights as described above.

In this type of a system, particularly when the load being raised is a heavy load or when the work platform being raised and held in its raised position is one on which workmen will remain, a high degree of danger exists as a result of any possible failure in the hydraulic system. In the single action type hydraulic system, should the hydraulic fluid be allowed to escape, the load or platform would drop instantly with potentially very serious results. In the ordinary single action hydraulic system, any break in the hydraulic fluid feed lines, which of necessity are flexible and of a non-rigid, relatively vulnerable material, would cause the load or platform to drop instantly.

SUMMARY OF THE INVENTION

The present invention provides a simple, effective, and economical means of preventing and avoiding the dangerous situations referred to above. The present invention provides a simple and economical safety valve which may be added to any conventional single action hydraulic system to provide a means of protection against the above described dangerous conditions. The safety valve comprises a base section into which the hydraulic fluid is pumped immediately prior to its entering the hydraulic cylinder. The base section includes a bore and a multiplicity of ports which provide access routes for the hydraulic fluid to and from the hydraulic cylinder. Included in the base section and slideably moveable within the bore is a spring actuated plunger adapted to seal one or more of the ports to prevent the escape of hydraulic fluid from the hydraulic cylinder should the hydraulic fluid be allowed somehow to escape from the system.

OBJECT OF THE INVENTION

An object of the present invention is to provide a simple, effective, and economical safety means to prevent the loss of hydraulic fluid from a hydraulic system from allowing a raised load to suddenly drop.

A further object of the present invention is to provide a safety valve which will trap hydraulic fluid within a hydraulic cylinder and prevent its escape.

DETAILED DESCRIPTION OF THE INVENTION

Figure 1:
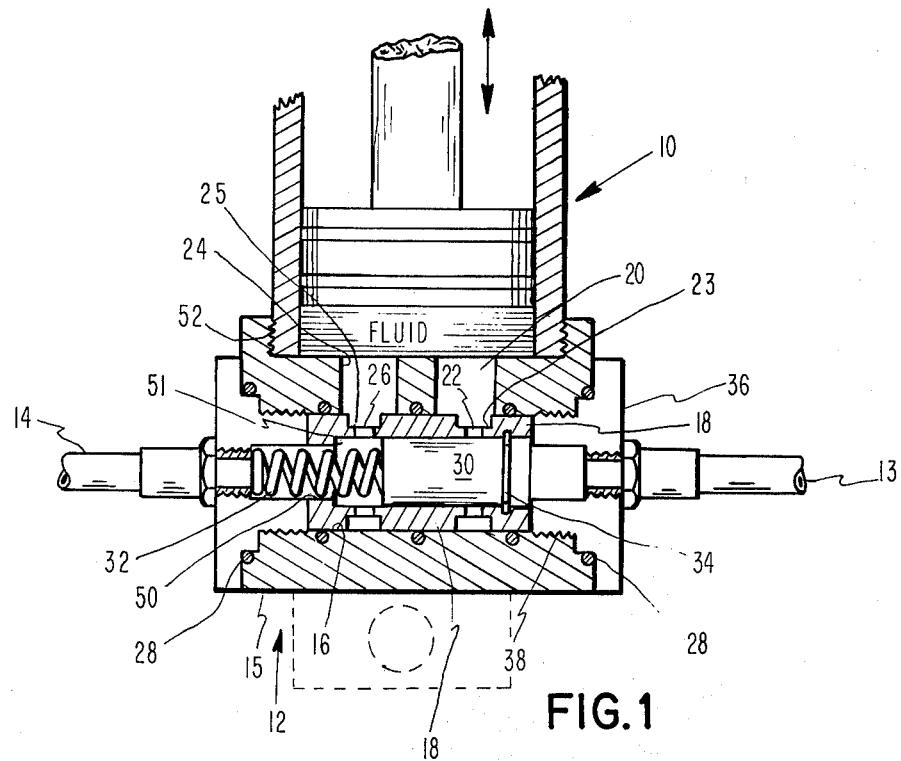
FIG. 1 is a cross-sectional view of the safety valve of the present invention.
Figure 2:
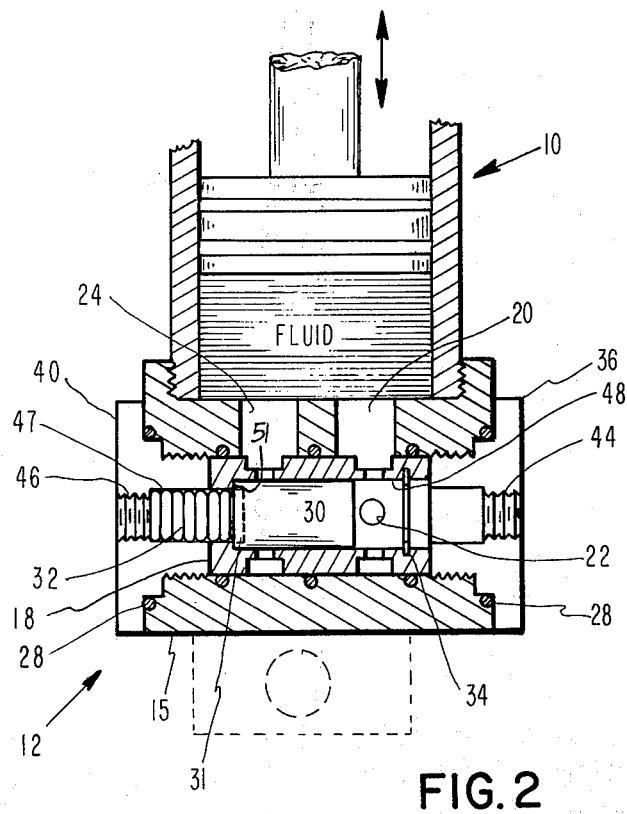
FIG. 2 is a cross-sectional view of the safety valve as seen in FIG. 1 wherein the plunger is retracted.
Figure 3:
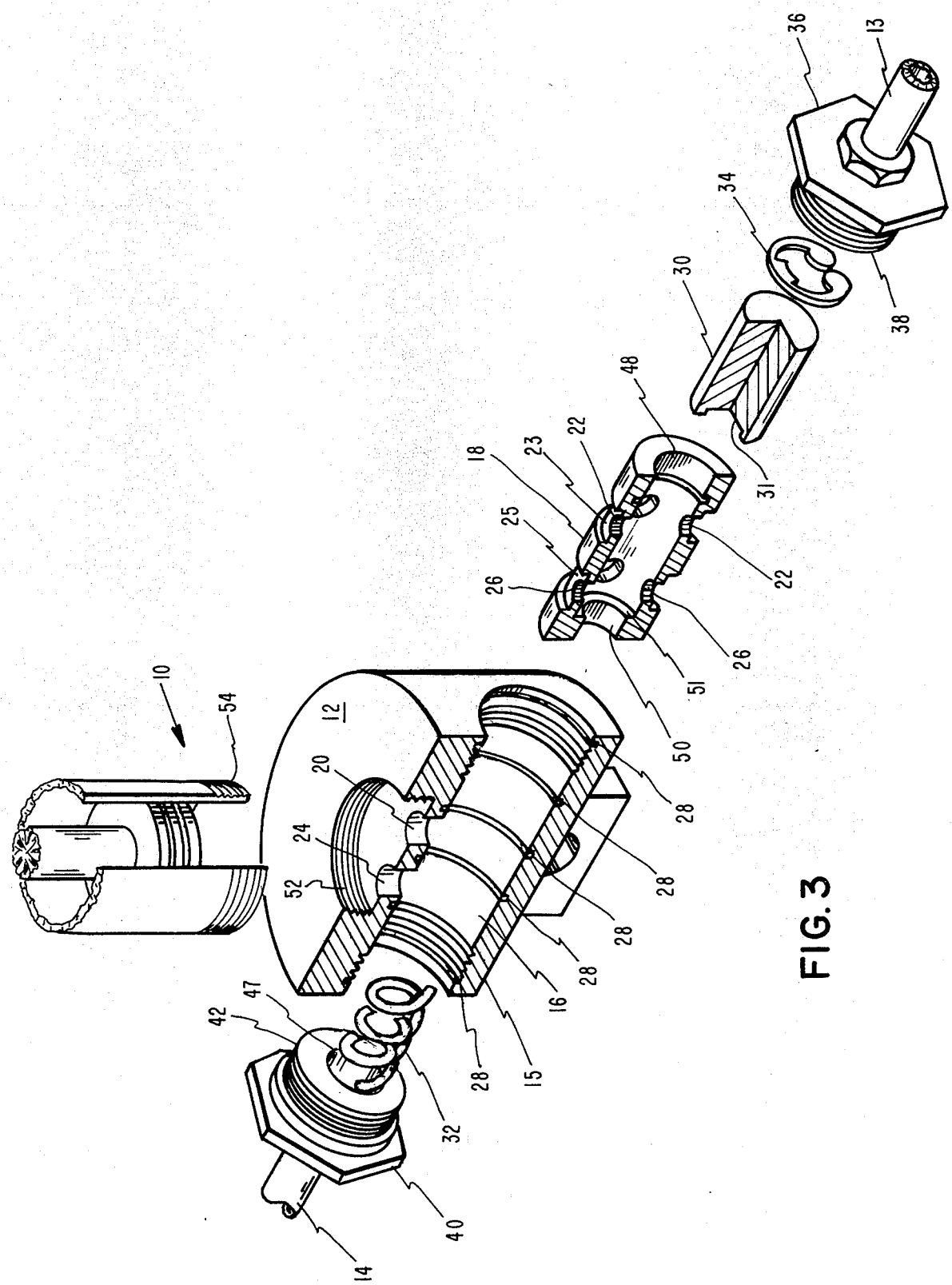
FIG. 3 is an exploded schematic view of the safety valve of the present invention.

As stated previously, the safety valve of the present invention is adapted for use with a single action hydraulic system. With reference to FIGS. 1, 2 and 3 of the drawings, what is shown there is a hydraulic cylinder 10, a safety valve 12, a hydraulic feed line 13 and a hydraulic discharge line 14. The safety valve 12 comprises a base section 15, a transverse bore 16 located therethrough, a feed port 20, and an exhaust port 24, which ports 20 and 24 are perpendicular to the bore 16 and connect the bore 16 to the hydraulic cylinder 10. Located within the bore 16 is a hollow cylindrical barrel 18 having two circumferential grooves 25 and 23 which correspond in position to ports 20 and 24, respectively. The barrel 18 further includes two series of vents 22 and 26 located respectively on grooves 23 and 25. The vents 22 and 26 remain open to allow for the free flow of hydraulic fluid through them from the bore 16 to the cylinder 10. O-rings 28 are positioned in series between the bore 16 and the barrel 18 and are so located to prevent leakage of hydraulic fluid between those members.

Positioned within the hollow cylindrical barrel 18 is a plunger 30 which is slideably movable within the barrel 18 and urged in the direction of the feed port 20 by spring 32. The plunger 30 includes an indentation 31 in which the spring 32 rides. The plunger 30 is restrained within the hollow cylindrical barrel 18 by a snap ring 34 positioned within the barrel 18 to restrain the piston 30 in such a position that vents 22 are initially blocked. The hollow cylindrical barrel 18 has a first internal diameter 48 which is slightly larger than the diameter of the plunger 30. Further, the hollow cylindrical barrel 18 includes a second internal diameter 50 which is smaller than the first internal diameter 48 and smaller than the diameter of the plunger 30 to form a shoulder 51 which acts as a stop for the plunger 30 under certain conditions which will be described later with reference to the operation of the safety valve. Inlet fitting 36 and exhaust fitting 40 are secured to the base section 15 by means of a threaded engagement with the bore 16, as shown at 38 and 42. The fittings 36 and 40 are so positioned in the bore 16 to firmly retain the barrel 18 in a predescribed position and include internally threaded areas 44 and 46 to which the hydraulic fluid feed and discharge lines 13 and 14 respectively, attaches. Further, exhaust fitting 40 includes an indent 47 in which the spring 32 rests.

The base 15 of the safety valve 12 is joined directly to thy hydraulic cylinder 10. This joinder may be accomplished in a number of ways, among which are included threaded attachment and welding as a means of attachment. As seen in FIG. 1, base 15 of the safety valve 12 may include a recessed area 52 encompassing the feed port 20 and the exhaust port 24. Recessed area 52 is so positioned that, after assembly of the base 15 with the hydraulic cylinder 10, the circumference of the recessed area 52 is radially surrounding the hydraulic cylinder 10 and includes threaded connection 54 with the hydraulic cylinder 10 acting as the male connector and the circumference of the recessed area 52 acting as the female connector. Another contemplated method of attaching the safety valve 12 to the hydraulic cylinder 10, is simply to weld the hydraulic cylinder 10 to the base 15 of the safety valve 12 with the hydraulic cylinder 10 resting in the recessed area 52 and radially surrounded by the circumference of the recessed area 52. Other similar and well known methods of attachment could obviously be utilized in the present invention depending upon the relative size and shape of the hydraulic cylinder 10 and the base section 15 of the safety valve 12.

As can be seen from FIG. 3, the safety valve 12 may be constructed simply from machined parts. The base section 15 of the safety valve 12 may simply consist of a cylindrical disc machined from steel or any other reasonably hard metallic material and having drilled transversely therethrough the bore 16 and also including ports 20 and 24 which may likewise be drilled. In addition, the safety valve 12 comprises the cylindrical barrel 18 which may also be machined from steel or other reasonably hard metallic material. Since the barrel 18 fits within the bore 16 and is rigidly retained therein, the machining dimensions of the barrel 18 and the bore 16 must be quite precise. However, since there is no further movement between the barrel 18 and the bore 16, the materials of these items need not be hardened under normal conditions because no wear will be encountered. Further, the O-rings 28 provide the necessary seal between the barrel 18 and the bore 16 to prevent leakage of hydraulic fluid between these members. As seen from FIG. 2, the O-rings 28 are located one between groove 23 and the inlet fitting 36, one between groove 25 and the exhaust fitting 40 and one between groove 23 and groove 25. The O-rings 28 should suffer very minimal deterioration because of the fact that there is no relative motion between the barrel 18 and the bore 16.

The respective ends of the bore 16 are threaded to receive the inlet fitting 36 and exhaust fitting 40 which maintain the barrel 18 in its fixed position. The respective ends of the bore 16 and the inlet fitting 36 and exhaust fitting 40 may also be adapted to accept O-rings for the purpose of sealing between those joints.

The plunger 30 fits within the barrel 18 and is movable within the barrel 18 as discussed above. As can be seen herein, plunger 30 and the spring 32 are the only movable parts of the safety valve 12. In order to limit leakage of hydraulic fluid past the plunger 30, the machining dimensions of the parts involved, that is the external diameter of the plunger 30 and the internal diameter 48 of the barrel 18, must be close tolerance. However, since hydraulic fluid is necessarily present within the barrel 18 upon any movement of the plunger 30, that movement will be well lubricated. However, in certain circumstances of use of the safety valve of the present invention where excessive heat might be expected to occur, the plunger 30 may be chrome plated.

From the above description, it can be seen that replacement of any of the parts involved is a very simple matter. Even though little wear should be experienced within the safety valve 12 for the reasons given above, should replacement be required of any of the parts of the present invention, that replacement would be a very simple matter.

OPERATION

In operation, in response to a call to raise a piston within a hydraulic cylinder 10, hydraulic fluid is introduced through a feed hose 13 and through inlet fitting 36 into the bore 16 of the base section 15. Upon the introduction of hydraulic fluid into the bore 16, the plunger 30 moves from its initial position abutting the snap ring 34 to a position abutting shoulder 51 as a result of the force of the hydraulic fluid which is under great pressure within the feed hose 13. With the plunger 30 moved to a position abutting shoulder 51, the hydraulic fluid is free to flow through the first series of vents 22, into groove 23, through feed port 20 and into the hydraulic cylinder 10. As in the conventional system, the introduction of the hydraulic fluid into the hydraulic cylinder 10 causes a piston or the like within the hydraulic cylinder 10 to be raised.

Should a failure in the hydraulic system occur at this time, which failure would, in most instances, be the result of a rupture of the feed line 13, pressure from the presence within the bore 16 of hydraulic fluid would cease to exert a force on plunger 30, thereby causing the spring 32 to force the plunger 30 back to its initial position abutting snap ring 34. By so doing, the plunger 30 would seal the first series of vents 22 and, consequently, feed port 20, to prevent the escape of hydraulic fluid from the hydraulic cylinder 10 through feed port 20 and to the ruptured feed hose 13. Thus, the ruptured feed hose 13 would be prevented from allowing the escape of hydraulic fluid from the hydraulic cylinder 10, thereby preventing the load being raised from fall, causing potential injury and damage.

Upon movement of the plunger 30 from its second position abutting shoulder 51 to its initial position abutting snap ring 34, the only means of escape for hydraulic fluid from the hydraulic cylinder 10 would be through discharge port 24, groove 25, vents 26, and eventually out through exhaust fitting 40 and discharge hose 14. Since hydraulic fluid under pressure adequate to raise a heavy load is never being forced through exhaust hose 14, as is the case with feed hose 13, the likelihood that exhaust hose 14 would rupture in comparison to the likelihood of feed hose 13 rupturing is very small.

When the load being raised by hydraulic cylinder 10 has attained its desired lift, hydraulic fluid is no longer introduced through feed hose 13. This discontinuation may have one of two effects on plunger 30, depending among other things on the strength of spring 32. First, adequate pressure within the hydraulic fluid may be maintained within bore 16 to keep plunger 30 in a second position abutting shoulder 51. In this situation, plunger 30 is preventing the escape of any hydraulic fluid from hydraulic cylinder 10 into exhaust tube 14 but remains prepared to move to its initial position rapidly in response to any loss of pressure within feed tube 13. On the other hand, if spring 32 is sufficiently strong, upon discontinuation of hydraulic fluid through feed tube 13, plunger 30 would move to its initial position abutting stop ring 34 and seal vents 22 and consequently feed port 20. In this situation, exhaust port 24 would be opened allowing hydraulic fluid to escape from the hydraulic cylinder 10 through exhaust port 24, groove 25, vent 26 and finally through exhaust tube 14. However, as long as the control means for exhaust tube 14, which control means are not a part of this invention, remain closed and exhaust tube 14 remains filled with hydraulic fluid, there could be no escape of hydraulic fluid from hydraulic cylinder 10 in that situation.

As stated previously, exhaust tube 14 is far less likely to rupture than feed tube 13 because of the relative pressures experienced by each. However, should exhaust tube 14 rupture at a time when the plunger 30 is in its initial position abutting snap ring 34, the equipment operator would need only to supply hydraulic fluid to inlet tube 13, thereby forcing the plunger 30 to its second position abutting shoulder 51. By so doing, the plunger 30 would then seal vents 26 and discharge port 24, preventing the escape of hydraulic fluid from the hydraulic cylinder 10 through the ruptured exhaust tube 14 and again avoiding the dangers of the load which is being raised or retained from falling. Under these circumstances the operator may hold the load at its then present location or raise the load to its maximum height until he has removed the load from the danger area to a locaton where it may be safely lowered. Although holding the load at its present level will result in the loss of some fluid, the operators ability to so retain the load provides an important safety alternative. The operator may then lower the load with only a loss of the fluid which is then present in the cylinder 10 without losing the remaining fluid in the control system.

Although the safety valve of the present invention has been described as it is utilized in conjunction with a single action hydraulic cylinder, the device with minor modifications could also be utilized with a double action hydraulic cylinder, and such usage should be considered within the contemplation of the present invention.

What is claimed is:

1. A safety valve for use in a hydraulic system, which system includes a hydraulic cylinder, hydraulic fluid, hydraulic fluid feed lines and hydraulic fluid control means, comprising:
   a. A base member having a bore therethrough;
   b. A first port and a second port located in the base member and perpendicular to the bore and joining the bore to the hydraulic cylinder;
   c. A hollow cylindrical barrel positioned within the bore and having a first circumferential groove and a second circumferential groove, said first circumferential groove and said second circumferential groove each including a series of vents and each being aligned with the first port and the second port, respectively;
   d. Inlet and exhaust fittings in the base member and cummunicating with a first end and a second end of the bore respectively; and
   e. A plunger actuated by a single spring and slideably located within the bore and adapted to seal one or more of the ports or the other to prevent passage of the hydraulic fluid from the hydraulic cylinder to the bore.

2. A safety valve as claimed in claim 1 wherein:
   a. The base member is secured directly to the hydraulic cylinder.

3. A safety valve as claimed in claim 1 wherein:
   a. The base member is threadedly secured to the hydraulic cylinder.

4. A safety valve as claimed in claim 1 wherein:
   a. The first port and the series of vents included in the first circumferential groove cooperate and the second port and the series of vents included in the second circumferential groove cooperate;
   b. The first port and series of vents cooperating therewith lie in closer proximity to the inlet fitting than the second port and series of vents cooperating therewith and the second port and series of vents cooperating therewith lie in closer proximity to the exhaust fitting than the first port and series of vents cooperating therewith; and
   c. The spring actuated plunger is normally urged by a spring to seal the first port and series of vents cooperating therewith.

5. A safety valve as claimed in claim 4 wherein:
   a. The plunger is slideably relocated to seal the second port and series of vents cooperating therewith and unseal the first port and series of vents cooperating therewith upon introduction of hydraulic fluid into the bore through the inlet fitting; and
   b. The plunger is slideably returned to seal the first port and series of vents cooperating therewith and unseal the second port and series of vents cooperating therewith upon interruption of the introduction of hydraulic fluid into the bore through the inlet fitting.

6. A safety valve as claimed in claim 1 wherein:
   a. The plunger is cylindrical and slideably moves within the hollow, cylindrical barrel;
   b. The barrel includes a first inside diameter slightly larger than the outside diameter of the plunger and a second inside diameter smaller than the outside diameter of the plunger to provide a shoulder to limit the slideable movement of the plunger;
   c. A plurality of O-rings are positioned between the barrel and the bore to prevent leakage of hydraulic fluid; and
   d. The inlet and exhaust fittings are threadedly secured to the base member so as to securely position the barrel within the bore and include internally threaded openings to receive the hydraulic fluid feedlines.

7. A safety valve as claimed in claim 6 wherein:
   a. A snap ring is positioned within the hollow, cylindrical barrel to further limit the slideable movement of the plunger.

* * * * *